United States Patent
Amini et al.

(10) Patent No.: US 9,293,130 B2
(45) Date of Patent: Mar. 22, 2016

(54) METHOD AND SYSTEM FOR ROBUST PATTERN MATCHING IN CONTINUOUS SPEECH FOR SPOTTING A KEYWORD OF INTEREST USING ORTHOGONAL MATCHING PURSUIT

(75) Inventors: Lisa Amini, Yorktown Heights, NY (US); Pascal Frossard, La Tour-de-Treme (CH); Effrosyni Kokiopoulou, Adliswil (CH); Oliver Verscheure, Hopewell Junction, NY (US)

(73) Assignee: Nuance Communications, Inc., Burlington, MA (US)

(*) Notice: Subject to any disclaimer, the term of this patent is extended or adjusted under 35 U.S.C. 154(b) by 1792 days.

(21) Appl. No.: 12/114,128

(22) Filed: May 2, 2008

(65) Prior Publication Data
US 2009/0276216 A1    Nov. 5, 2009

(51) Int. Cl.
G10L 15/00    (2013.01)
G10L 15/04    (2013.01)
G10L 15/02    (2006.01)
G10L 15/22    (2006.01)

(52) U.S. Cl.
CPC .............. *G10L 15/02* (2013.01); *G10L 15/22* (2013.01)

(58) Field of Classification Search
CPC ............................... G10L 15/02; G10L 15/22
USPC ................................ 704/270, 232, 236, 275
See application file for complete search history.

(56) References Cited

U.S. PATENT DOCUMENTS

| 4,241,329 | A | 12/1980 | Bahler et al. |
| 5,199,077 | A | 3/1993 | Wilcox et al. |
| 5,842,163 | A | 11/1998 | Weintraub |
| 6,157,909 | A * | 12/2000 | Mauuary et al. ............. 704/228 |
| 6,505,156 | B1 | 1/2003 | Junkawitsch et al. |
| 8,055,502 | B2 * | 11/2011 | Clark et al. ................... 704/270 |
| 2003/0078777 | A1 * | 4/2003 | Shiau ........................... 704/251 |
| 2006/0015338 | A1 * | 1/2006 | Poussin ........................ 704/251 |

OTHER PUBLICATIONS

Proc. 29th Int. Conf. on Information Sciences and Systems, Rezaiifar and Jafarkhani, 1995.*

(Continued)

*Primary Examiner* — Farzad Kazeminezhad
(74) *Attorney, Agent, or Firm* — Wolf, Greenfield & Sacks, P.C.

(57) ABSTRACT

A method for speech recognition, the method includes: extracting time-frequency speech features from a series of reference speech elements in a first series of sampling windows; aligning reference speech elements that are not of equal time span duration; constructing a common subspace for the aligned speech features; determining a first set of coefficient vectors; extracting a time-frequency feature image from a test speech stream spanned by a second sampling window; approximating the extracted image in the common subspace for the aligned extracted time-frequency speech features with a second coefficient vector; computing a similarity measure between the first and the second coefficient vector; determining if the similarity measure is below a predefined threshold; and wherein a match between the reference speech elements and a portion of the test speech stream is made in response to a similarity measure below a predefined threshold. The said reference speech elements correspond to a keyword of interest, wherein Simultaneous Orthogonal Matching Pursuit (SOMP) is used in their alignment.

12 Claims, 3 Drawing Sheets

(56) References Cited

OTHER PUBLICATIONS

Evert Dijkstra and Christian Piguet, A New Systolic Decomposition for the Dynamic Time Warping Algorithm, 1986, pp. 365-368, IEEE.
Ganesh Ramakrishnan, Soumen Chakrabarti, Deepa Paranjpe and Pushpak Bhattacharyya, Is Question Answering an Acquired Skill?, May 17-22, 2004, New York, NY.
Chak Shun Lai and Bertram E. Shi, A One-Pass Strategy for Keyword Spotting and Verification, 2001, pp. 377-380, IEEE.
Rui Cai, Lie Lu and Alan Hanjalic, Unsupervised Content Discovery in Composite Audio, 2005, ACM.
Francine Chen, Marti Hearst, Julian Kupiec, Jan Pedersen and Lynn Wilcox, Metadata for Mixed-Media Access, Sigmond Record, Dec. 1994, pp. 64-71, vol. 23, No. 4.

* cited by examiner

METHOD AND SYSTEM FOR ROBUST PATTERN MATCHING IN CONTINUOUS SPEECH FOR SPOTTING A KEYWORD OF INTEREST USING ORTHOGONAL MATCHING PURSUIT

BACKGROUND OF THE INVENTION

1. Field of the Invention

The present invention relates generally to speech recognition and, more particularly, to a method, article, and system for noise-resilient spotting of spoken keywords from continuous streams of speech data in mismatched environments.

2. Description of the Related Art

Speech recognition (also known as automatic speech recognition or computer speech recognition) converts spoken words to machine-readable input (for example, to binary code for a string of character codes). The term "voice recognition" may also be used to refer to speech recognition, but more precisely refers to speaker recognition, which attempts to identify the person speaking, as opposed to what is being said. Speech recognition applications include voice dialing (e.g., "Call home"), call routing (e.g., "I would like to make a collect call"), appliance control, content-based spoken audio search (e.g., find a podcast where particular words were spoken), simple data entry (e.g., entering a credit card number), preparation of structured documents (e.g., a radiology report), speech-to-text processing (e.g., word processors or emails), and in aircraft cockpits (usually termed Direct Voice Input).

Speech pattern matching involves the matching of characteristic parameters extracted from an incoming test speech signal with those of a collection of pre-recorded reference speech templates. Keyword spotting, speech recognition, and speaker detection are typical tasks that employ speech pattern matching techniques for recognition or detection purposes. In keyword spotting and speech recognition tasks, the test speech sample and reference speech templates are uttered words, while speaker detection uses several seconds of individuals' voices.

SUMMARY OF THE INVENTION

A method for speech recognition in mismatched environments, the method includes: extracting time—frequency speech features from a series of reference speech elements in a first series of sampling windows; aligning the extracted time—frequency speech features in response to reference speech elements from the series of speech elements that are not of equal time span duration; constructing a common subspace for the aligned extracted time—frequency speech features; determining a first set of coefficient vectors for the aligned extracted time—frequency speech features; extracting a time—frequency feature image from a test speech stream spanned by a second sampling window; approximating the extracted time—frequency feature image in the common subspace for the aligned extracted time—frequency speech features with a second coefficient vector; computing a similarity measure between the first set of coefficient vectors and the second coefficient vector; determining if the similarity measure is below a predefined threshold; and wherein a match between the reference speech elements and a portion of the test speech stream spanned by the second sampling window is made in response to a similarity measure below a predefined threshold.

TECHNICAL EFFECTS

As a result of the summarized invention, a solution is technically achieved for a method, article, and system for noise-resilient spotting of spoken keywords from continuous streams of speech data in mismatched environments.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
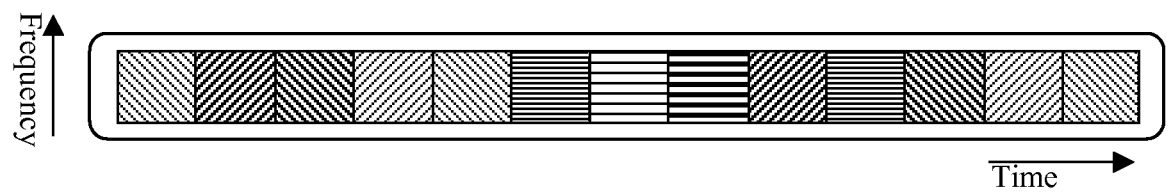
FIG. 1 is a typical time-frequency image representation of a speech segment using perceptual linear predictive (PLP) modified power spectrum for speech feature extraction.

The detailed description explains the preferred embodiments of the invention, together with advantages and features, by way of example with reference to the drawings.

DETAILED DESCRIPTION

Conventional methods for speech pattern recognition are known to degrade dramatically when a mismatch occurs between training and testing conditions. For example, an acoustic model trained using clean speech data, or data from a particular environment may offer poor recognition/detection performance for noisy test data, or data from a different acoustic environment. A mismatch between training and testing data may be caused by a number of factors, with background noise being one of the most prominent. Traditional approaches for removing the mismatch, and thereby reducing the effect of noise on speech recognition include: (i) removing the noise from the test signal (known as noise filtering or speech enhancement), and (ii) constructing a new acoustic model to match the appropriate test environment (known as noise or environment compensation).

Typical methods for noise filtering in speech recognition include spectral subtraction, Wiener filtering, and RASTA filtering (relative spectral filtering), with each assuming the availability of a priori knowledge, such as the spectral characteristic of the noise. Typical methods for noise compensation include model adaptation, parallel model combination (PMC), multicondition or multistyle training, and Stereo-based Piecewise Linear Compensation for Environments (SPLICE). PMC composes a noisy acoustic model from a clean model, by incorporating a statistical model of the noise; multicondition training constructs acoustic models suitable for a number of noisy environments, through the use of training data from each of the environments; while SPLICE improves noise robustness by assuming that stereo training data exist for estimating the corruption characteristics.

Recent efforts in speech recognition have focused on improving speech recognition under mismatched conditions, including methods requiring less knowledge of the noise or speech environment. Knowledge of noise and speech environment may be difficult to obtain in real-world applications involving mobile environments subject to unpredictable nonstationary noise. For example, recent studies on the missing-feature method suggest when knowledge of the noise is insufficient for cleaning up the speech data, the severely corrupted speech data may be ignored, and the focus is shifted solely to recognition of the data with the least contamination. The shift in focus may effectively reduce the influence of noise, while requiring less knowledge than usually needed for noise filtering or compensation. However, the missing feature method is only effective for partial noise corruption; that is, when the noise only affects part of the speech representation.

Embodiments of the present invention provide a computer-implemented method for matching spoken keywords/pattern matching from continuous streams of speech data in mismatched environments. Pattern matching methods within embodiments of the present invention provide flexible, computationally efficient keyword identification in continuous speech data that performs well in mismatched environments. Pattern matching in embodiments of the invention, rely on the simultaneous sparse approximation of speech signals in a time-frequency domain, where a simple sparse approximation problem requests an approximation of a given input signal as a linear combination of elementary signals drawn from a large, linearly dependent collection. A generalization employed in embodiments of the invention is the implementation of simultaneous sparse approximations. Existing pattern matching relies on the approximation of several input signals at once, using different linear combinations of the same elementary signals. Sparse representations over redundant dictionaries exhibit interesting properties such as compact representation of signals and noise resilience.

Figure 2:
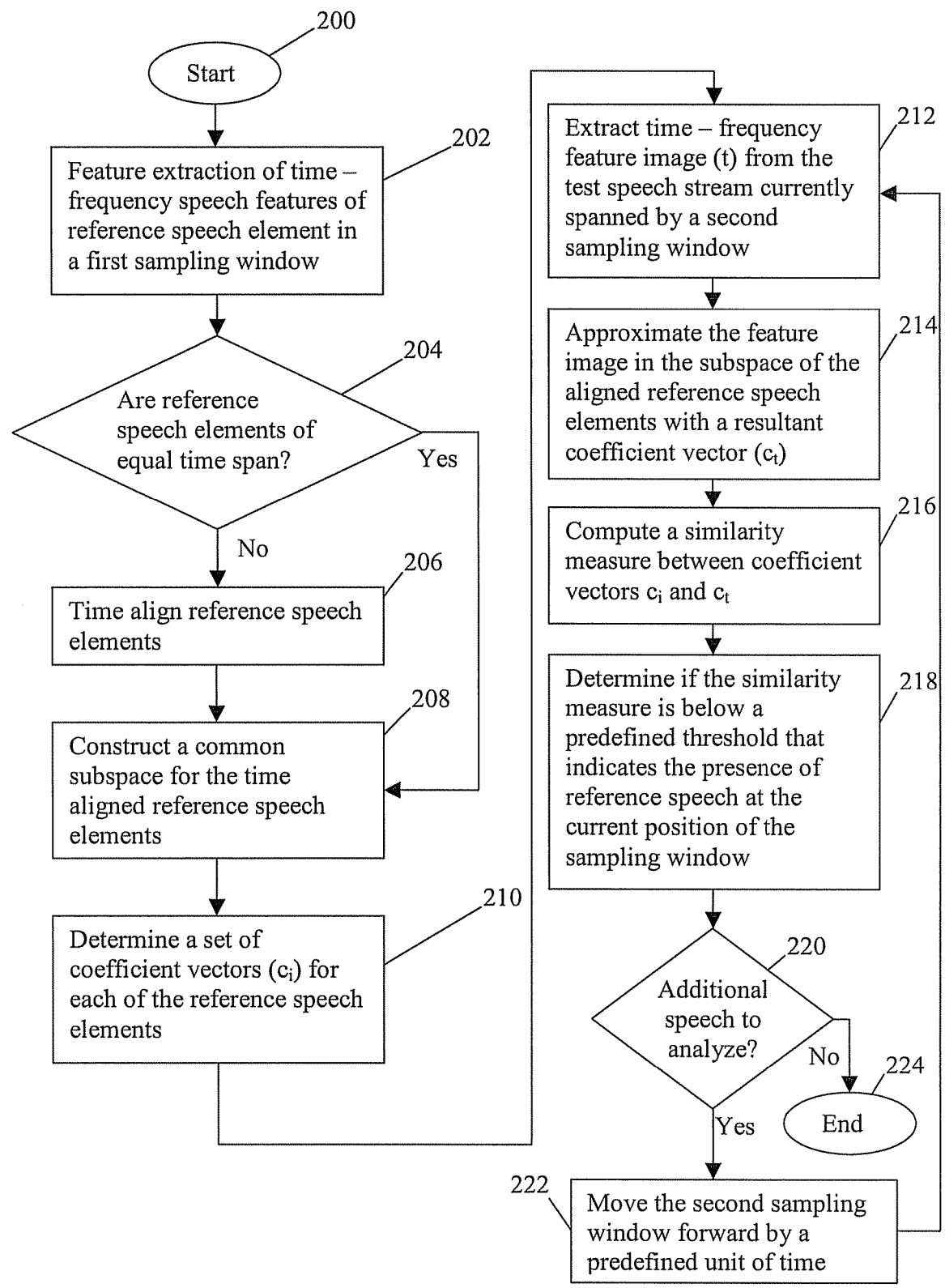
FIG. 2 is a flowchart illustrating a method for presenting closed captioning on portable device display screens according to embodiments of the invention.

A method for implementing embodiments of the invention includes an offline training phase and an online testing phase that are outlined below and in the flow chart of FIG. 2.

The offline training/learning phase includes the extraction of relevant time-frequency features from reference spoken keywords, time aligning the extracted features given a reference time span, building a sparse representation statistical model from the time-aligned speech features, and approximating each reference speech feature set in the subspace.

The online testing phase includes the extraction of time-frequency features from a sliding window of speech data, time aligning the extracted features given the duration of the aligned reference spoken keyword, approximating the speech feature set in the learnt subspace that results in a coefficient vector 'c', computing a distance measure 'd' between the coefficient vector 'c' and each learnt coefficient element corresponding to the reference spoken keyword, and thresholding the distance measure 'd' so as to produce a binary answer (i.e., pattern does indeed match or pattern does not match the reference spoken keyword).

In embodiments of the invention, the offline learning or training phase for creating a repository of matching templates includes the following steps involved in creating a matching template from N≥1 occurrence(s) of a reference speech element (e.g., N occurrences of a specific keyword of interest in the training speech corpus).

1) Feature extraction—In the feature extraction step (block 202), the time-frequency speech features (spectral or cepstral) for all short-time (possibly overlapping) windows spanning each occurrence of the reference speech elements or keyword of interest are extracted from the set of training speech signals. One exemplary approach is to use a Perceptual Linear Predictive (PLP) modified power spectrum as the feature domain. FIG. 1 shows a typical time-frequency image representation of a speech segment using perceptual linear predictive (PLP) modified power spectrum for speech feature extraction. However, embodiments of the present invention may also include other feature domains such as Mel-Frequency Cepstral Components (MFCC). Each speech signal in a PLP is represented as a two-dimensional signal in the time-frequency plane. The PLP feature space exhibits a smooth structure, which is amenable to sparse representations.

2) Alignment—The alignment step (decision block 204 is No, block 206) is required if the reference spoken keywords are not of equal time span (duration). The 'N' extracted feature sets are time-aligned given a reference time span. Various state-of-the-art techniques may be used for alignment. In particular, embodiments of the present invention employ a Dynamic Time Warping (DTW) technique to align training speech segments of different durations.

3) Construction of common subspace—Given a redundant dictionary that spans the Hilbert space of the signals, build a sparse representation model (subspace) common to the N aligned speech feature time-frequency sets. In particular, the present invention builds a common subspace (block 208) using the Simultaneous Orthogonal Matching Pursuit (SOMP) method.

Approximation in the common subspace—When an approximation is made in a common subspace (block 210), each reference keyword feature set is approximated in the subspace. The approximation in the common subspace results in a set of N coefficient vectors $C=[c_1, c_2, \ldots, c_N]$, which hold the weights of the linear combination in the approximation. C is obtained by solving N small least-squares problems (equations). The approximation may be interpreted as a dimensionality reduction, since each keyword feature is ultimately represented by a small coefficient vector $c_i$.

In embodiments of the invention, the matching of test speech segments with templates from the repository (online testing phase) proceeds as follows. Consider a template to be matched and a test speech signal of duration at least equal to the duration of the template to be matched (possibly infinite for continuously streamed speech data). A present embodiment of the invention is configured with a sliding window mechanism, where the time span of the window is equal to the duration of the template (referenced (aligned) spoken keyword) to be matched. In an embodiment of the invention, an online continuous testing phase (keyword spotting) consists of the following steps:

1) The time-frequency feature image 't' is extracted from the segment of the test speech stream that is indicated by the current sampling window position (the speech signal the current sliding window spans) (block 212).

2) The feature image is approximated in the subspace corresponding to the template (reference keyword) to be matched, resulting in a coefficient vector $c_t$ (block 214).

3) A similarity (distance) measure is computed (block 216) between the coefficient vector $c_t$ and each of the N coefficient vectors resulting from the training phase. The distance measure $d(.,.): R^K \times R^K \to R^+$ (where R is the space of real numbers and K is the length of each coefficient vector) is computed among $c_t$, and each of the N coefficient vectors resulting from the training phase. Example similarity (distance) metrics d( ) include the standard $L_1$ and $L_2$ distances.

4) The minimum (M or $d_{min}$) (distance among the N vectors is computed and compared against a predefined threshold T. Whenever $d_{min}$ or M<T it indicates the presence of the keyword at the current location of the window (block 218).

5) The sliding window is moved forward by a unit of time (block 222) and the process repeats from block 212, until there is no more speech content to analyze (decision block 220 is No) and the process ends (block 224).

An algorithm for keyword spotting based on sparse representations of speech signals in a modified PLP spectrum in mismatched environments according to embodiments of the invention is presented below. The training signals are jointly represented in a common subspace built by simple generating functions in the PLP feature space. The subspace is trained in order to capture common time-frequency structures from different occurrences of the keyword, which is to be spotted. The algorithm employs a sliding window mechanism in the PLP domain and a subspace-based semantic similarity metric, which facilitates the direct comparison of the current window with the training data relative to the common subspace.

During the training phase:
1) Extract the time-frequency features of all speech elements $s_i$ in the training set.
2) Align the training speech elements using Dynamic Time Warping (DTW)
3) Extract the subspace model $\phi$ using Simultaneous Orthogonal Matching Pursuit (SOMP).
4) Compute the coefficient vector $c_i$ of each training speech segment si and $\phi'$ as well.

During online testing phase:
1) for p=0, . . . do (for loop)
2) Extract the feature image t of the speech segment indicated by the current window location.
3) Compute the coefficient vector $c_t = \phi'_t$.
4) Compute the distance among the coefficient vectors (i.e., $d_{min}(p) = \min_i d(c_t, c_i)$)
5) if $d_{min}(P) < \theta$ then output that the keyword is present at position p
6) end (for loop) if p=p+1

It is noted that in each step the algorithm requires:
The solution of a small least-squares system, and the computation of N distances among (low dimensional) coefficient vectors.

Actual experimental simulations utilizing embodiments of the present invention have been conducted. In one simulation utilizing an embodiment of the invention, the objective was to independently detect the keywords "dark" and "water" in the sentence 'she had your dark suit in greasy wash water all year' (TIMIT Corpus, SA1 part) spoken by several different speakers from various dialect regions. Table 1 illustrates the performance (detection rates) of the present invention, referred to as SPARSE, against a standard DTW-based keyword spotting method, referred to as TM.

TABLE 1

|  | Sparse | TM |
| --- | --- | --- |
| "dark" | 93.4 | 89.3 |
| "water" | 91.1 | 76.2 |

Figure 3:
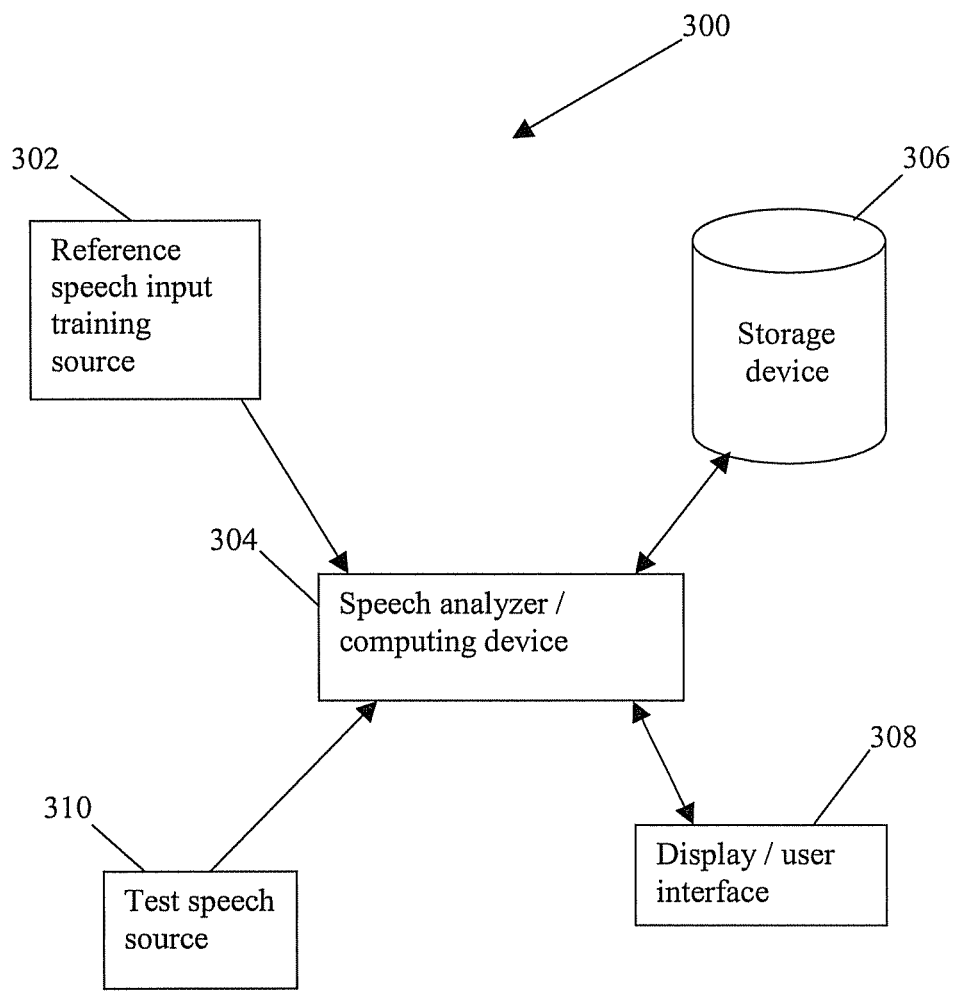
FIG. 3 is a block diagram of an exemplary system for implementing embodiments of the invention.

FIG. 3 illustrates an exemplary system 300 for providing noise-resilient spotting of spoken keywords from continuous streams of speech data in mismatched environments. The system 300 includes a speech analyzer/computing device 304 in electrical communication with a reference speech input training source 302, a storage device 306, a display/user interface 308, and a test speech source 310. The speech analyzer/computing device 304 records inputs from the reference speech input training source 302 and the test speech source, and stores the speech inputs (302, 310) in the storage device 306. The display/user interface 308 provides speech analysis results, and is configured with a graphical user interface (GUI) for user adjustments and interaction.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for speech recognition in mismatched environments, the method comprising:
   extracting, by a computing device, time-frequency speech features from a series of reference speech elements in a first series of sampling windows spanning each occurrence of a keyword of interest, wherein the time-frequency speech features represent each reference speech element as a two-dimensional image in the time-frequency plane, wherein extracting time-frequency speech features from the series of reference speech elements is obtained from a feature domain comprising Perceptual Linear Predictive (PLP) modified power spectrum;
   aligning, by the computing device, the extracted time-frequency speech features when the reference speech elements from the series of speech elements are not of equal time span duration;
   constructing, by the computing device, a sparse representation model common to the aligned extracted time-frequency speech features, using simultaneous sparse approximation of reference speech signals in a time-frequency domain, wherein the simultaneous sparse approximation determines an approximation of a reference speech signal as a linear combination of reference speech signals drawn from a large, linearly dependent collection of reference speech signals;
   determining, by the computing device, a first set of coefficient vectors for the aligned extracted time-frequency speech features;
   extracting, by the computing device, a time-frequency feature image from a test speech stream spanned by a second sampling window, wherein the reference speech elements and the test speech stream are obtained under mismatched conditions where the test speech stream contains background noise;
   approximating, by the computing device, the extracted time-frequency feature image in the sparse representation model for the aligned extracted time-frequency speech features with a second coefficient vector;
   computing, by the computing device, a similarity measure between the first set of coefficient vectors and the second coefficient vector;
   determining, by the computing device, if the similarity measure is below a predefined threshold; and
   wherein a match between the reference speech elements and a portion of the test speech stream spanned by the second sampling window is made in response to the similarity measure being below the predefined threshold, the match indicating the presence of the keyword of interest in the second sampling window;

wherein Simultaneous Orthogonal Matching Pursuit (SOMP) is used for constructing the sparse representation model for the aligned extracted time-frequency speech features by extracting a subspace of common time-frequency structures from different occurrences of the keyword of interest.

2. The method of claim 1, wherein the method further comprises:

incrementing the second sampling window by a unit of time and extracting a new time-frequency feature image from the test speech stream spanned by the incremented second sampling window;

approximating the extracted new time-frequency feature image in the sparse representation model for the aligned extracted time-frequency speech features with a new coefficient vector;

computing a similarity measure between the first set of coefficient vectors and the new coefficient vector;

determining if the similarity measure is below the predefined threshold;

wherein a match between the reference speech elements and a portion of the test speech stream spanned by the incremented second sampling window is made in response to a similarity measure below the predefined threshold; and wherein the process of incrementing the second sampling window and computing additional similarity measures continues until the test speech stream is exhausted.

3. The method of claim 1, wherein the aligning the extracted time-frequency speech features employs Dynamic Time Warping (DTW).

4. The method of claim 1, wherein the first set of coefficient vectors are obtained by solving least squares equations.

5. A computer-readable storage device encoded with computer instructions that, when executed by a computing device, perform a method for speech recognition in mismatched environments, the method comprising:

extracting time-frequency speech features from a series of reference speech elements in a first series of sampling windows spanning each occurrence of a keyword of interest, wherein the time-frequency speech features represent each reference speech element as a two-dimensional image in the time-frequency plane, wherein extracting time-frequency speech features from the series of reference speech elements is obtained from a feature domain comprising Perceptual Linear Predictive (PLP) modified power spectrum;

aligning the extracted time-frequency speech features when the reference speech elements from the series of speech elements are not of equal time duration;

constructing a sparse representation model common to the aligned extracted time-frequency speech features, using simultaneous sparse approximation of reference speech signals in a time-frequency domain, wherein the simultaneous sparse approximation determines an approximation of a reference speech signal as a linear combination of reference speech signals drawn from a large, linearly dependent collection of reference speech signals;

determining a first set of coefficient vectors for the aligned extracted time-frequency speech features;

extracting a time-frequency feature image from a test speech stream spanned by a second sampling window, wherein the reference speech elements and the test speech stream are obtained under mismatched conditions where the test speech stream contains background noise;

approximating the extracted time-frequency feature image in the sparse representation model for the aligned extracted time-frequency speech features with a second coefficient vector;

computing a similarity measure between the first set of coefficient vectors and the second coefficient vector; and determining if the similarity measure is below a predefined threshold, wherein a match between the reference speech elements and a portion of the test speech stream spanned by the second sampling window is made in response to the similarity measure being below the predefined threshold, the match indicating the presence of the keyword of interest in the second sampling window;

wherein Simultaneous Orthogonal Matching Pursuit (SOMP) is used for constructing the sparse representation model for the aligned extracted time-frequency speech features by extracting a subspace of common time-frequency structures from different occurrences of the keyword of interest.

6. A computer-readable storage device as defined in claim 5, wherein the method further comprises:

incrementing the second sampling window by a unit of time and extracting a new time-frequency feature image from the test speech stream spanned by the incremented second sampling window;

approximating the extracted new time-frequency feature image in the sparse representation model for the aligned extracted time-frequency speech features with a new coefficient vector;

computing a similarity measure between the first set of coefficient vectors and the new coefficient vector;

determining if the similarity measure is below the predefined threshold, wherein a match between the reference speech elements and a portion of the test speech stream spanned by the incremented second sampling window is identified in response to a similarity measure below the predefined threshold; and continuing the process of incrementing the second sampling window and computing additional similarity measures until the test speech stream is exhausted.

7. A computer-readable storage device as defined in claim 5, wherein aligning the extracted time-frequency speech features uses Dynamic Time Warping (DTW).

8. A computer-readable storage device as defined in claim 5, wherein determining the first set of coefficient vectors comprises solving least squares equations.

9. A system comprising a computing device and a storage device encoded with instructions that, when executed by the computing device, perform a method for speech recognition in mismatched environments, the instructions configured to:

extract time-frequency speech features from a series of reference speech elements in a first series of sampling windows spanning each occurrence of a keyword of interest, wherein the time-frequency speech features represent each reference speech element as a two-dimensional image in the time-frequency plane, wherein extracting time-frequency speech features from the series of reference speech elements is obtained from a feature domain comprising Perceptual Linear Predictive (PLP) modified power spectrum;

align the extracted time-frequency speech features when the reference speech elements from the series of speech elements are not of equal time duration;

construct a sparse representation model common to the aligned extracted time-frequency speech features, using simultaneous sparse approximation of reference speech signals in a time-frequency domain, wherein the simultaneous sparse approximation determines an approximation of a reference speech signal as a linear combination of reference speech signals drawn from a large, linearly dependent collection of reference speech signals;

determine a first set of coefficient vectors for the aligned extracted time-frequency speech features;

extract a time-frequency feature image from a test speech stream spanned by a second sampling window, wherein the reference speech elements and the test speech stream are obtained under mismatched conditions where the test speech stream contains background noise;

approximate the extracted time-frequency feature image in the sparse representation model for the aligned extracted time-frequency speech features with a second coefficient vector;

compute a similarity measure between the first set of coefficient vectors and the second coefficient vector; and determine if the similarity measure is below a predefined threshold, wherein a match between the reference speech elements and a portion of the test speech stream spanned by the second sampling window is made in response to the similarity measure being below the predefined threshold, the match indicating the presence of the keyword of interest in the second sampling window;

wherein Simultaneous Orthogonal Matching Pursuit (SOMP) is used to construct the sparse representation model for the aligned extracted time-frequency speech features by extracting a subspace of common time-frequency structures from different occurrences of the keyword of interest.

10. The system of claim 9, wherein the instructions are further configured to:

increment the second sampling window by a unit of time and extract a new time-frequency feature image from the test speech stream spanned by the incremented second sampling window;

approximate the extracted new time-frequency speech feature image in the sparse representation model for the aligned extracted time-frequency speech features with a new coefficient vector;

compute a similarity measure between the first set of coefficient vectors and the new coefficient vector;

determine if the similarity measure is below the predefined threshold, wherein a match between the reference speech elements and a portion of the test speech stream spanned by the incremented second sampling window is identified in response to a similarity measure below the predefined threshold; and continue the process of incrementing the second sampling window and computing additional similarity measures until the test speech stream is exhausted.

11. A system as defined in claim 9, wherein the instructions are configured to align the extracted time-frequency speech features using Dynamic Time Warping (DTW).

12. A system as defined in claim 9, wherein the instructions are configured to determine the first set of coefficients by solving least squares equations.

* * * * *